United States Patent [19]
Pawlick

[11] Patent Number: 5,478,178
[45] Date of Patent: Dec. 26, 1995

[54] HIGH SPEED ROTARY BORING TOOL

[75] Inventor: James A. Pawlick, Sterling Hts., Mich.

[73] Assignee: Valenite Inc., Madison Heights, Mich.

[21] Appl. No.: 267,624

[22] Filed: Jun. 29, 1994

[51] Int. Cl.⁶ .................................................. B23B 29/00
[52] U.S. Cl. ........................... 408/153; 408/227; 408/713
[58] Field of Search ........................................ 408/153, 161,
408/162, 168, 179, 200, 227, 223, 231, 713

[56] References Cited

U.S. PATENT DOCUMENTS

| | | | |
|---|---|---|---|
| 3,091,138 | 5/1963 | Berry, Jr. | 408/232 |
| 3,189,976 | 6/1965 | Pickril | 408/168 |
| 3,711,216 | 1/1973 | Zurcher | 408/161 |
| 4,105,360 | 8/1978 | Keller | 408/187 |
| 4,133,399 | 1/1979 | Herrmann | 408/713 |
| 4,621,958 | 11/1986 | Ewing | 408/713 |
| 4,659,264 | 4/1987 | Friedline | 408/713 |

Primary Examiner—Daniel W. Howell
Attorney, Agent, or Firm—John W. Gregg

[57] ABSTRACT

A high speed rotary boring tool has a plurality of cutter inserts evenly spaced around the circumference of a boring bar. Each cutter insert is individually adjustable so that its cutting tip is spaced a desired distance from the tool rotational axis. Each cutter insert is mounted so that its leading face has a zero rake angle in the axial direction, and a negative rake angle in the radial direction. The cutting tip on each insert is defined by two chamfer surfaces on the intersecting edges of the insert leading face, such that each chamfer surface acts as a chip-deflector surface. The boring tool is designed for cutting action during axial feed into the hole and also during axial feed out of the hole.

15 Claims, 3 Drawing Sheets

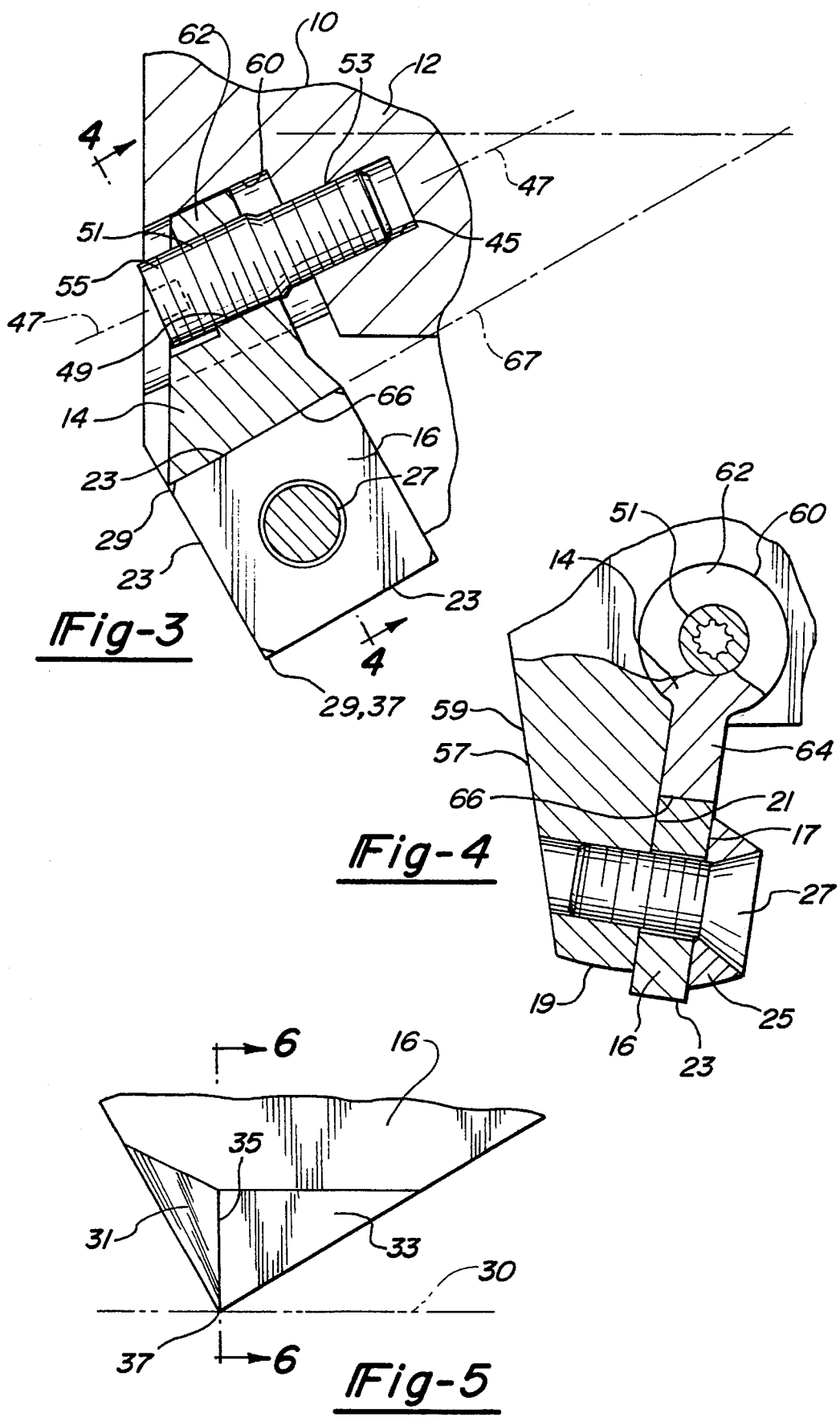

5,478,178

HIGH SPEED ROTARY BORING TOOL

BACKGROUND OF THE INVENTION

1. Field of the Invention

This invention relates to rotary boring tools, especially boring tools capable of machining a hole surface when moving in two directions, i.e. when moving into the hole and also when moving out of the hole.

2. Prior Developments

The concept of boring and finishing holes at high speeds is facilitated by contouring the cutter insert so that it machines the hole surface while it is moving into the hole and also while it is moving out of the hole. However, the geometry of conventional cutter inserts is not suited for effective cutting in two axial feed directions.

SUMMARY OF THE INVENTION

The present invention relates to a high speed rotary boring tool wherein the cutter insert has a zero rake angle in the axial direction, whereby the cutting tip has essentially the same relationship to the hole surface in both directions of axial feed, i.e. into the hole or out of the hole.

The cutter insert has a negative rake angle in the radial direction, whereby the surfaces that define the cutting tip act as chip deflection surfaces. The chip deflector surfaces have a V-configuration, so that one of the surfaces deflects the chips when the tool is advanced into the hole, and the other surface deflects the chips when the tool is retracted out of the hole.

A preferred boring tool construction of the present invention comprises a rotary boring bar having a multiple number of cutter inserts spaced evenly around the bar circumference; typically there are five cutter inserts spaced equally or unequally apart around the bar circumference.

The cutting tips on the cutter insert are spaced from the bar rotational axis the same distance so that each cutting tip can potentially exert a cutting action on the hole surface. The cutting tips on the inserts are preferably located in a single radial plane generated by the bar rotational axis so that each cutting tip can participate in the hole-bore operation. The use of multiple cutter inserts advantageously permits higher axial feed rates.

During high speed boring operations, the pressure of each cutting tip on the hole surface tends to produce momentary deflections of the hole surface away from the axis of the bored hole, so that after a single axial pass of the tool into the hole, the hole diameter is slightly less than the diameter defined by the array of cutting tips. However, during the return stroke of the tool out of the hole, the cutting tips finish the hole surface to the desired dimension.

The boring tool of the present invention is designed for high speed boring operations in two axial directions, whereby a smooth precision hole surface is formed with and axial feed of the tool into and out of the hole.

BRIEF DESCRIPTION OF THE DRAWINGS

FIG. 3 is an enlarged fragmentary sectional view taken on line 3—3 in FIG. 2.

FIG. 4 is a fragmentary sectional view taken on line 4—4 in FIG. 3.

FIG. 5 is an enlarged front view of a cutting tip construction formed on a cutter insert used in the FIG. 1 boring tool.

DETAILED DESCRIPTION OF A PREFERRED EMBODIMENT OF THE INVENTION

Figure 1:
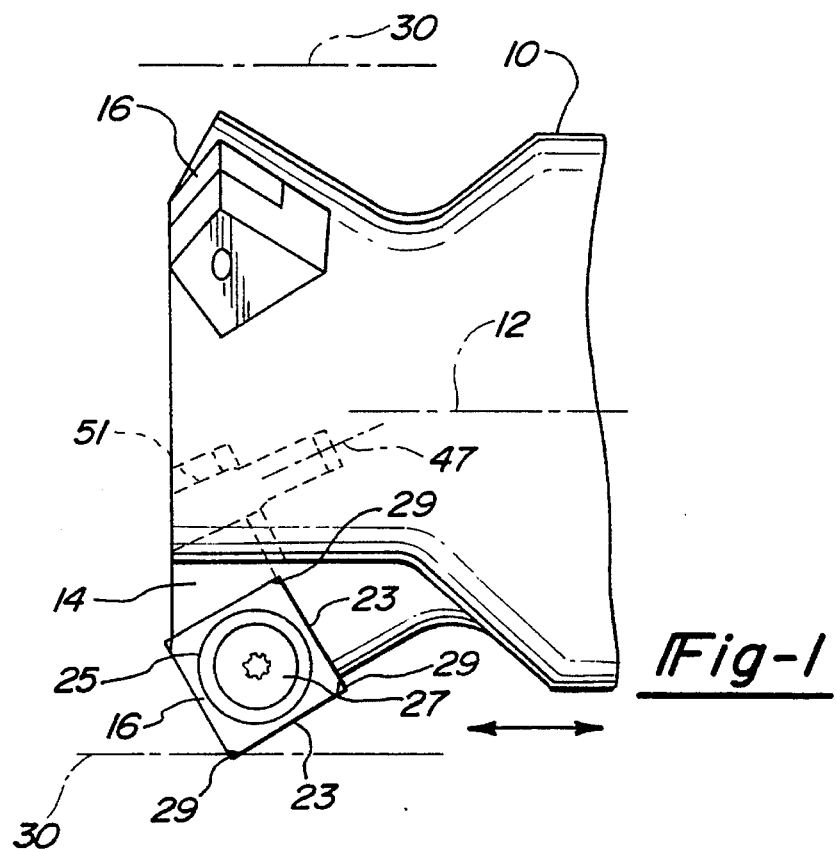
FIG. 1 is a fragmentary side elevational view of a high speed boring tool constructed according to the invention.

FIGS. 1 through 4 show a rotary boring tool that comprises a boring bar 10 having a rotational axis 12. FIG. 1 shows only the end portion of the bar "that mounts the cutter inserts; the non-illustrated end portion of the bar" is used to mount the bar in a cutting machine of a type that rotates the bar while feeding the bar into and out of the hole that is to be machined. The boring bar is designed for high speed axial feed rates and high rotational speeds, e.g. several thousand revolutions per minute.

Figure 2:
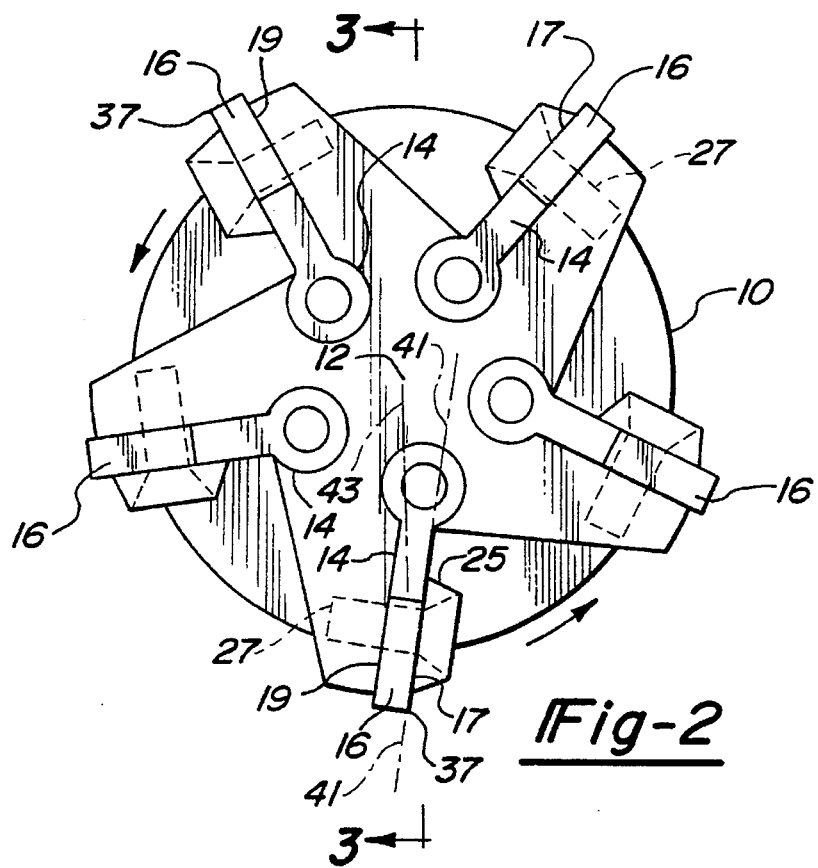
FIG. 2 is an end view of the boring tool shown in FIG. 1.

As shown in FIG. 2, boring bar 10 mounts five cutter insert adjustable wedges 14 at evenly spaced locations around the bar circumference. Each adjustable wedge 14 acts as a locator for cutter insert 16.

Each cutter insert 16 comprises a flat polygonal body formed of a material suitable for cutting materials at high rotational speeds and axial feed rates. Typically, each cutter insert polygonal body could be formed of silicon nitride having a coating of titanium carbide. As shown, cutter insert 16 has a flat leading face 17 adapted to engage the work surface, and a trailing face 19 seated against flat support face 21 on bar 10. As viewed in FIG. 1, cutter insert 16 has a square polygonal shape that defines four ninety degree corners and four edge surfaces 23 interconnecting the leading and trailing faces 17 and 19. The term "leading" and "trailing" are used with reference to the direction of tool rotation, as denoted by the circular arrow in FIG. 2.

Each cutter insert 16 is retained on the support face 21 by means of an annular pad 25 and clamping screw 27. Each pad 25 is formed of a hard abrasion-resistant material, such as carbide or hardened steel, whereby the pad is resistant to the abrasive action of flying metal chips generated at the leading face of 17 of the cutter insert. Pad 25 acts as a shield to prevent the metal chips from contacting the head of clamping screw 27.

Clamping screw 27 is a conventional cap screw comprising a threaded shank extending through a circular hole in cutter insert 16 into a threaded hole in support face 21. The circular hole in cutter insert 16 is oversized to permit adjustment of the insert along face 21. The screw further comprises a conical head seated in a conical recess in pad 25, whereby the head of the screw is recessed into the pad. The pad exerts a clamping pressure on cutter insert 16.

FIG. 1 shows a representative cutter insert 16 having a corner 29 that forms a cutting tip engaged with the surface 31 of the hole in the workpiece, whereby the cutting tip exerts a cutting action as the boring bar rotates around axis 12 while moving axially, as denoted by the feed arrows in FIG. 1. The depth of cut is typically less than 0.005/0.010 inch while the bar is feeding into the hole.

Figure 6:
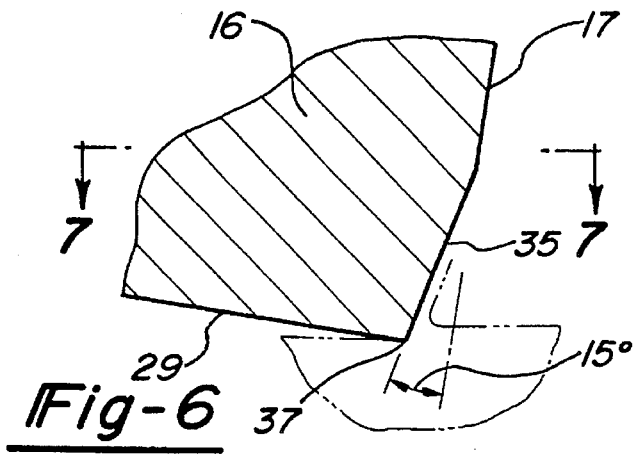
FIG. 6 is a sectional view taken on line 6—6 in FIG. 5
Figure 7:
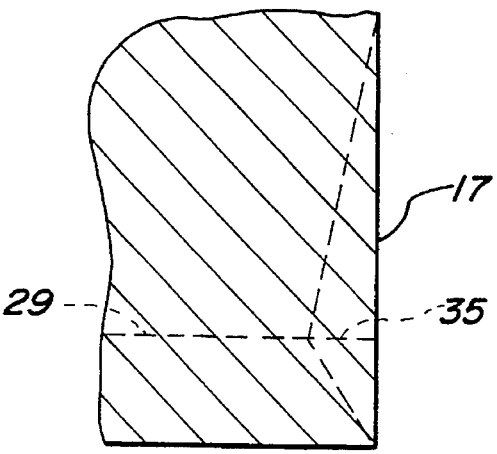
FIG. 7 is a sectional view taken on line 7—7 in FIG. 6

FIGS. 5, 6 and 7 show, in magnified form, the construction of the cutting tip defined by corner 29. As shown, the intersecting edges on the leading face 17 of the cutter insert have flat chamfer faces 31 and 33 angled to face 17 to form chip-deflecting surfaces facing in opposite directions. The intersection line 35 between chamfer surfaces 31 and 33 is angled to the edge of the corner 29 at an angle of about fifteen degrees, as viewed in FIG. 6.

Depending on the axial feed direction on the boring tool (into or out of the hole in the workpiece), one of the chamfer surfaces 31 or 33 will be engaged by a metal chip generated by the tip of the cutter insert. The cutting tip is the intersection of surfaces 31 and 33 with corner 29. In the drawings, numeral 37 references the cutting tip.

Each cutter insert 16 is mounted so that the leading face 17 has a zero rake angle in the axial direction, whereby the cutting tip 37 has essentially the same relationship to the hole surface in either axial feed direction of boring bar 10. As shown in FIG. 2, the leading face 17 of a representative cutter insert is located in an imaginary plane 41 that parallels the boring bar rotational axis 12, whereby face 17 has a zero rake angle in the axial direction. Face 17 is acutely angled to an imaginary radial line (or plane) 43 extending from rotational axis 12 through the associated cutting tip 37 at an angulation of approximately nine degrees; i.e. in FIG. 2, the angulation between planes 41 and 43 is nine degrees. The leading face 17 of the cutter insert thus has a negative rake angle of nine degrees in the radial direction. Such a negative rake angle promotes a desired breakage of the chips generated by cutting tip 37.

In the illustrated boring bar, the cutting tips 37 of the cutting inserts 16 are located in a common rotational plane. Each cutting tip is spaced the same distance from the rotational axis 12, such that each cutting tip is potentially able to exert a cutting action on the hole surface. Each pocket element 14 is movable along an adjustment axis 47 (FIG. 3.) to control the position of the associated cutter insert 16, whereby the tips 37 of the inserts are located the same distance from rotational axis 12. Adjustment axis 47 is defined by an internally threaded bore 45 in bar 10; said bore being acutely angled to axis 12 at an angle of about twenty-five degrees.

The end face of boring bar 10 has a counterbore 60 that slidably accommodates a cylindrical barrel portion of 62 of the adjustable wedge 14. Adjustable wedge 14 has a flat-faced section 64 that is slidable on the support face 21 on bar 10. The adjustable wedge can slide along support face 21 in a direction paralleling the axis 47 of the hole 45 and counterbore 60.

Adjustable wedge 14 has an end edge surface 66 that is located at an angle of thirty degrees to bar rotational axis 12. As viewed in FIG. 3. edge surface 66 is in a plane 67 that intersects axis 12 at an angle of thirty degrees. The thirty degree angulation of edge surface 66 is purposely made slightly different than the twenty-five degree angulation of bore axis 47, such that adjustment of adjustable wedge 14 along axis 47 causes edge surface 66 to move toward or away from rotational axis 12, depending on the direction in which adjustable wedge 14 is adjusted (to the right or left in FIG. 3).

As seen in FIGS. 3 and 4, edge surface 66 constitutes an abutment surface engageable with an edge surface 23 on cutter insert 16. Edge surface 66 absorbs the cutting force and otherwise locates the cutter insert at a desired position on support face 21. Screw 27 is tightened on pad 25 to clamp the cutter insert in a desired position of adjustment. Cutter insert 16 has four cutting tips 37, so that the cutter insert can be rotated around the axis of clamp screw 27 to activate a selected one of cutting tips 37. Edge surface 66 acts as an abutment surface for any of the four edge surfaces on cutter insert 16.

Element 14 may be considered as an adjustable wedge, wherein movement axis 47 constitutes one surface of the wedge, and abutment surface 66 constitutes the other surface of the wedge. Surface 66 serves as a locator surface for the associated cutter insert 16.

The adjustment of edge surface 66, toward or away from central axis 12, is used to adjust the position of the associated cutter insert 16, whereby the cutting tips 37 on all five cutter inserts are precisely the same distance from axis 12. The aim is to ensure that each cutting tip 37 is in position to participate in the hole boring operation. All five cutting tips 37 simultaneously exert a desired cutting action, such that the axial feed of the tool can be appreciably increased without adversely affecting the cutting action or the surface finish of the bored hole.

Figure 8:
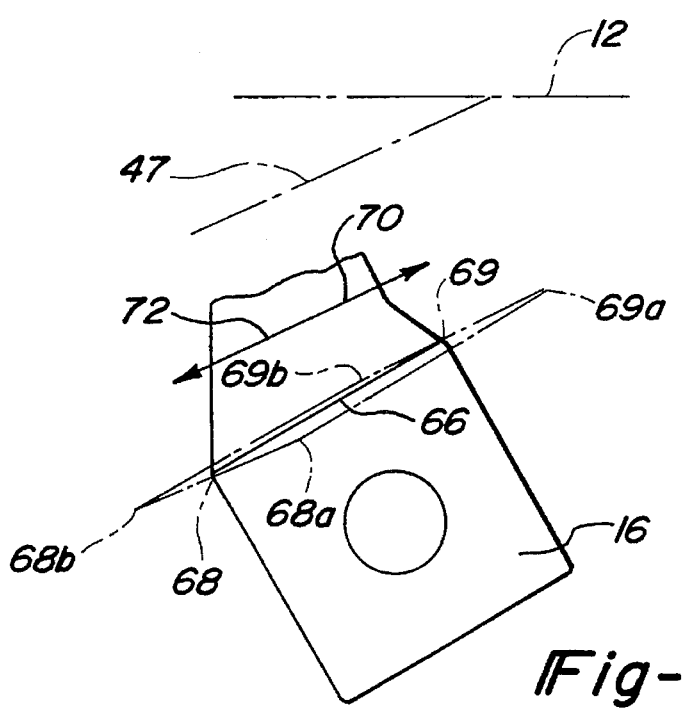
FIG. 8 is a diagrammatic illustration of an adjusting process that can be used with the tool of FIG. 1.

FIG. 8 diagrammatically shows the adjusting action. In FIG. 8, the end points of edge surface 66 are designated by numerals 68 and 69. Adjustment of edge surface 66 to the rights, as indicated by arrow 70, causes end points 68 and 69 to move to new positions 68a and 69a; this has the effect of moving cutter insert 16 a slight distance away from the tool rotational axis. Adjustment of edge surface 66 to the left, as indicated by arrow 72, causes end points 68 and 69 to move to new positions 68b and 69b; this has the effect of moving the cutter insert 16 a slight distance toward the tool rotational axis. As previously noted the purpose of the adjustment is to ensure that all of the cutting tips are the same distance from tool rotational axis 12.

FIG. 3 illustrates a mechanism for adjusting the position of adjustable wedge element 14, as shown diagrammatically in FIG. 8. The adjusting mechanism comprises a differential screw 51 having threads 53 engaged with threaded bore 45 in bar 10, and threads 55 engaged with a threaded hole 49 in barrel portion 62 of adjustable wedge 14. Threads 53 and 55 are helixed in different directions. Also, the pitch distance of the respective threads may be different.

The action of the differential screw 51 is such that when the screw is screwed further into bore 45 the adjustable wedge 14 shifts a slight distance to the left (as viewed in FIG. 3). When the screw is moved leftwardly, i.e., out of bore 45, adjustable wedge 14 shifts a slight distance to the right (as viewed in FIG. 3).

The use of a differential screw tends to produce a relatively fine adjusting action. A further degree of precision results from the fact that edge surface 66 is angled to the direction of adjustment at a slight angle (five degrees in the illustrated arrangement).

The adjustment wedge process is performed on the various adjustable wedges 14, as necessary to achieve a condition wherein the tips 37 of the various cutter inserts are located the same distance from rotational axis 12. The objective is to make each cutting tip 37 fully effective as a cutting instrument whereby relatively high axal feed rates of the boring tool can be used in combination with high rotational tool speeds to achieve a very fast boring operation.

The drawings show a particular embodiment of the invention. However, it will be appreciated that some variations in tool construction can be utilized while practicing the invention.

What is claimed is:

1. A high speed rotary boring tool comprising a boring bar having a rotational axis; a plurality of cutter insert support faces on said bar at spaced points around the bar circumference; a cutter insert carried on each support face; each cutter insert having a cutting tip oriented on a radial line generated from the boring bar rotational axis; each cutter insert having a flat leading face in a plane that parallels the bar rotational axis, whereby said leading face has a zero rake angle in the axial direction; said leading face being acutely angled to said radial line, whereby said leading face has a negative rake angle in the radial direction; said leading face having two edges intersecting to form a corner and two chamfer faces at the corner to form a tip, the chamfer faces joining on a line through the corner angled toward the support face and providing negative axial rake at the tip in both directions of axial movement of the tool.

2. The boring tool of claim 1 wherein the angle with the leading faces of the line joining the chamfer faces is approximately fifteen degrees.

3. The boring tool of claim 1, wherein said intersecting edges intersect at an angle of ninety degrees.

4. The boring tool of claim 1, and further comprising means for adjusting each said cutter insert toward or away from the boring bar rotational axis whereby each cutting insert tip is spaced the same distance from the bar rotational axis.

5. The boring tool of claim 4, wherein there are five spaced cutter inserts; the leading face on each cutter insert having a negative rake angle in the radial direction measuring about nine degrees.

6. The boring tool of claim 4, wherein each said adjusting means comprises a wedge element slidably adjustable on each said support face for movement along a directional line acutely angled to the bar rotational axis; said wedge element having an abutment surface engageable with an associated cutter insert to control the position of the insert on the support face.

7. The boring tool of claim 6, wherein each said adjusting means further comprises an adjusting screw extending through said wedge element into the boring bar, said adjusting screw being turnable to move the wedge element along the aforementioned directional line.

8. The boring tool of claim 7 wherein said abutment surface is acutely angled to said directional line at an angle no more than five degrees.

9. The boring tool of claim 7, wherein said adjusting screw has an axis coincident with the aforementioned directional line, said adjusting screw being angled to the bar rotational axis at an angle of about twenty-five degrees, and said abutment surface being angled to said bar rotational axis at an angle of about thirty degrees.

10. The boring tool of claim 7, wherein said adjusting screw is a differential screw.

11. The boring tool of claim 7, wherein said adjusting screw is a differential screw having a first thread engaged with a hole in the wedge element and a second thread engaged with a threaded hole in the body boring bar; said first and second threads having different directions, whereby rotational motion of the screw adjusts the position of the wedge element.

12. The boring tool of claim 1, and further comprising means for releasable clamping each cutter insert to the associated support face; each clamping means comprising an annular pad seated against the leading face of the cutter insert and a clamping screw extending through the pad and cutter insert into the boring bar; said screw having a head recessed into the pad so that the pad shields the screw from being contacted by metal chips.

13. The boring tool of claim 12, wherein each clamping screw is a cap screw having a conical head; each annular pad having a conical seating surface for the associated screw head whereby said head is recessed into the pad.

14. The boring tool of claim 13, wherein each annular pad is formed of carbide or hardened steel.

15. The boring tool of claim 1, wherein the cutting tips of the cutter inserts are located in a common rotational plane generated by the bar rotational axis; each cutting tip being spaced the same distance from the bar rotational axis.

* * * * *